May 14, 1968     M. FICHTER     3,383,696
VIBRATORY RECORDING APPARATUS
Filed July 13, 1966     3 Sheets-Sheet 1
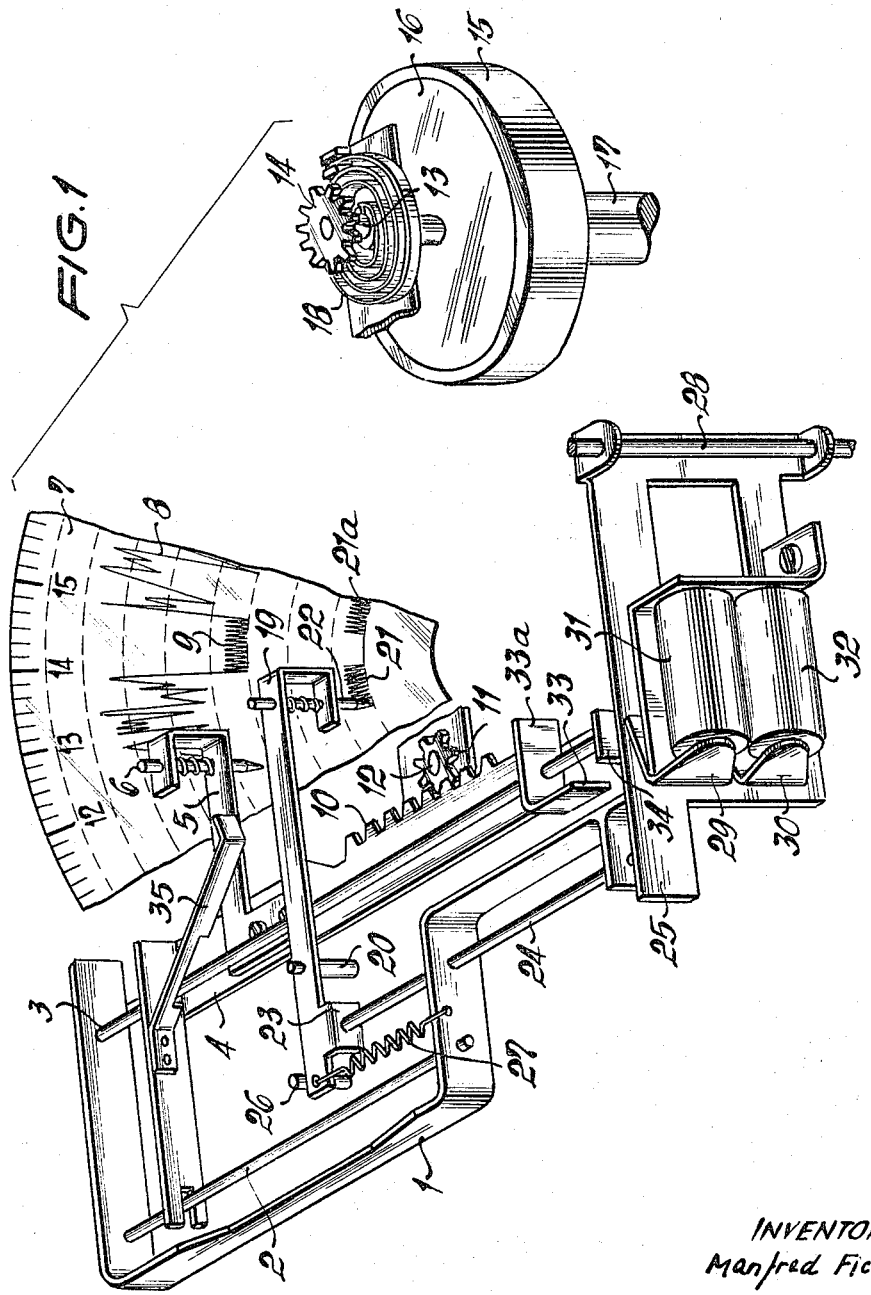
INVENTOR
Manfred Fichter
by Michael J. Striker
ATTORNEY

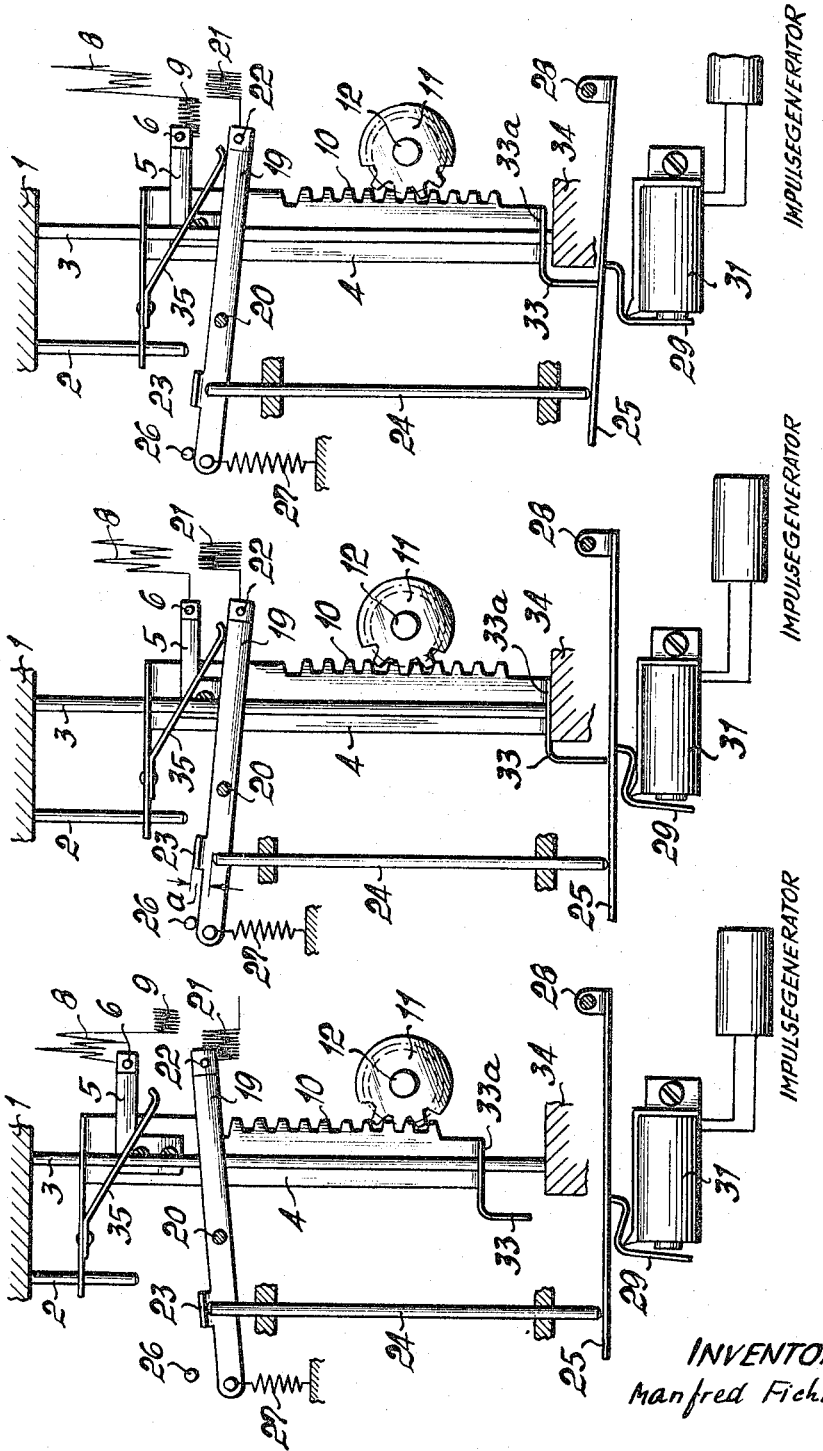

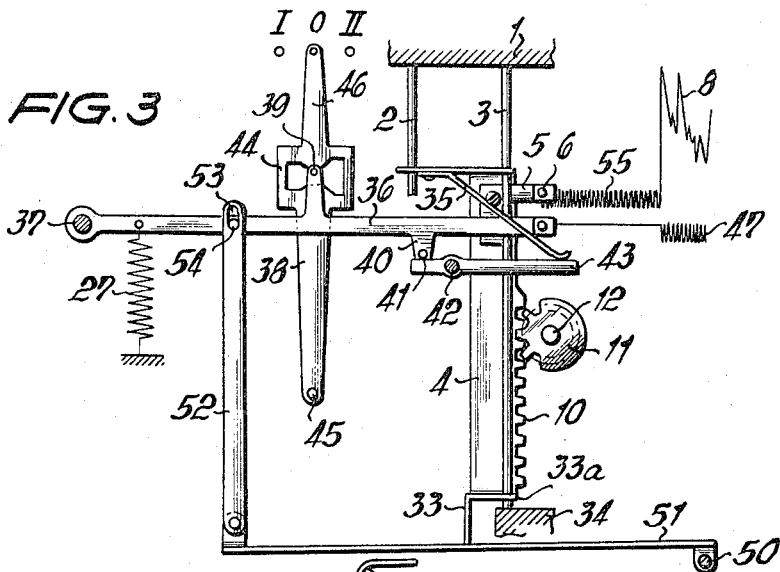
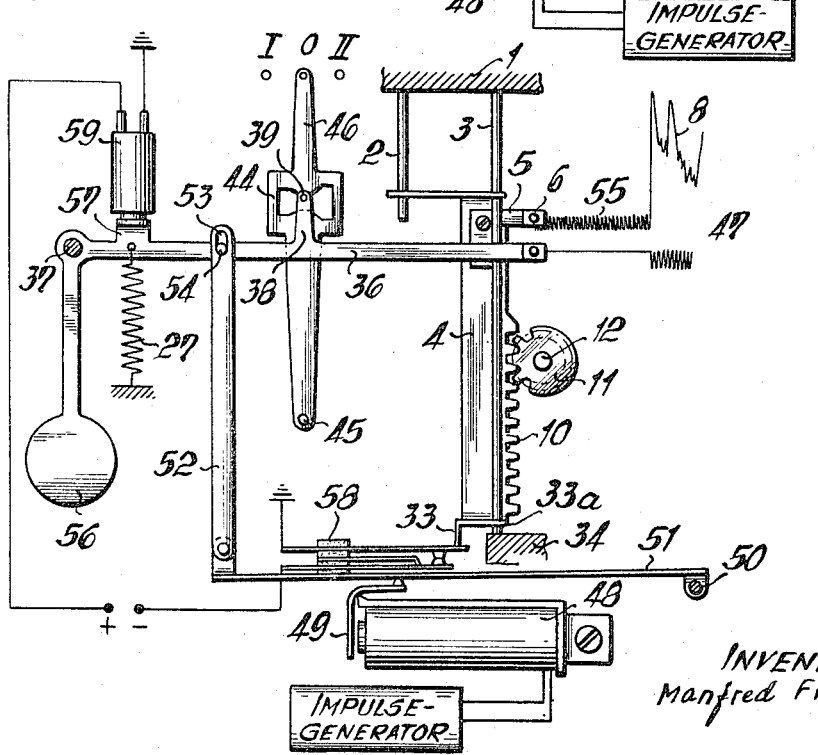

United States Patent Office 3,383,696
Patented May 14, 1968

3,383,696
VIBRATORY RECORDING APPARATUS
Manfred Fichter, Weiler, Germany, assignor to Kienzle Apparate GmbH, Villingen, Black Forest, Germany
Filed July 13, 1966, Ser. No. 564,800
Claims priority, application Germany, July 15, 1965, K 56,630
15 Claims. (Cl. 346—7)

The present invention relates to a vibratory recording instrument for a vehicle, and more particularly to recording apparatus of the type in which the speed of a vehicle is recorded on a rotating record sheet in the form of an irregular line, the standstill of the vehicle is recorded by a circular line, and certain operational conditions of the vehicle are recorded in the form of a zig-zag line.

In known recording instruments, the record sheet is rotated by a clock, and recording means are controlled by speed responsive means to make a recording which represents the speed of the vehicle during its operation, and the times during which the vehicle was stopped. In addition, recording means are used which record, preferably in the form of zig-zag lines, particular operational conditions, such as the use of certain devices, loading and unloading times, working periods of the driver, or of several drivers, and similar events so that the time required for each of these conditions can be determined.

In accordance with the prior art, the zig-zag recordings are either produced by a pendulum oscillated by vibrations of the moving vehicle caused by irregularities of the roadway, or by bimetal elements which mechanically control the recording means.

In order to make special recordings for representing the time of special conditions, such as loading or unloading, the prior art provides a bimetal switch, or a switch operated by a heated wire, to control the standard recording means which records speed variations, to make a zig-zag recording for indicating the time during which special conditions prevail while the vehicle is at a standstill. While the cost of such apparatus is comparatively low, the disadvantage of thermo switches is the short span of life which results in frequent disturbances of the operation necessitating service of the instrument and replacement of the thermo switches. Another important disadvantage is that different thermo switches cause oscillations of different amplitude, so that each thermo switch has to be accurately and individually adjusted in order to control the recording means to always make zig-zag recordings of the same desired amplitude. Even if a thermo switch has been accurately adjusted, variations of the air temperature causes a noticeable variation of the impulse frequency, resulting in zig-zag lines of different density.

Other known vibratory recording devices for recording driving time and time of standstill, as provided in most recording instruments for vehicles, are constructed as a pendulum swinging in a plane, which has the disadvantage that they function best in one particular position of the instrument, restricting the choice of positions in which the instrument can be mounted in the vehicle. The reason therefor is that the pendulum is oscillated by shock waves produced by irregularity of the roadway surface, and consequently acting substantially only in vertical direction. Furthermore, modern shock absorbers and air cushioning arrangements consume so much energy, that the pendulum of the recording instrument is not sufficiently actuated so that its amplitude varies. In fact, on very smooth road surfaces, the pendulum will not swing at all, and no zig-zag recordings will be made.

It has been proposed to oscillate the recording means depending on the distance traveled. This has the disadvantage that the recording is not completely continuous at low speeds of the vehicle, and that the density of the zig-zag line varies.

However, an exactly uniform width and continuity of the zig-zag recording is of great importance if the recording is to be automatically evaluated.

It is one object of the invention to overcome the disadvantages of known recording instruments making zig-zag recordings, and provide a recording instrument of simple construction capable of making clear and accurate zig-zag recordings for representing the duration of certain operational conditions of a vehicle or machine provided with the recording apparatus.

Another object of the invention is to provide a vibratory recording apparatus which operates independently of oscillations produced by the road surface.

Another object of the invention is to provide a recording apparatus with vibratory electric drive means which eliminate thermo switches.

Another object of the invention is to provide a recording apparatus for making zig-zag recordings which can be inexpensively manufactured, and mounted on a vehicle in any position.

With these objects in view, the present invention relates to a recording instrument which is adapted to record the speed of a vehicle dependent on the time. Two recording means are provided for making recordings on a record carrier in the form of a sheet rotated by clockwork. In accordance with the invention, an electronic impulse generator produces impulses which are supplied to an electromagnet whose armature is oscillated to drive recording means in an oscillating movement so that a zig-zag line is recorded. One recording means is provided for making a zig-zag recording or a continuous line depending on the condition of the vehicle, and another recording means normally records the speed variations of the vehicle, and produces a zig-zag recording while the car is stopped and certain operational conditions prevail. When the vehicle stops, or starts, respectively, the vibrations produced by the oscillating armature of the electromagnet to oscillate one or the other recording means to produce a zig-zag recording.

One embodiment of the invention comprises vibratory drive means, such as an electromagnet energized by an electronic impulse generator; first recording means connected to and oscillated by the vibratory drive means for making a first recording on a moving record carrier in the form of a zig-zag line; second recording means for making a second recording on the record carrier; speed responsive means controlling the second recording means to record speed variations, said second recording means moving between speed recording positions during movement of the vehicle, and being in a zero position when the vehicle is stopped; and coupling means for connecting the vibratory drive means with the second recording means only in the zero position.

The second recording means in zero position disconnects the first recording means from the vibratory drive means.

Consequently, the first recording is a zig-zag line only while the second recording means is in a speed recording position and the vehicle has been started, and the second recording is a zig-zag line only when the vibratory drive means is operated in the zero position while the vehicle is stopped. If the vibratory drive means is not operated while the vehicle is stopped and the second recording means is in the zero position, none of the recording means records a zig-zag line.

In order to prevent that the recording means are not oscillated if the drive means is fraudulently disconnected, or fails, it is advantageous to provide the first recording means with a pendulum which produces oscillations during movement of the vehicle even if the vibratory drive means fail. If only the second drive means in the zero position is to be oscillated, the pendulum is automatically arrested and blocked. This may be accomplished by an electromagnetic arresting means having a switch operated by the second recording means in the zero position.

It is also advantageous to provide adjustable stop means controlling the amplitude of the first recording means so that zig-zag lines of different width are recorded dependent on the position of the adjustable stop means. In this manner, distinguishable zig-zag recordings can be made for identifying different conditions, such as operation of the vehicle by different drivers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary perspective view illustrating an embodiment of the invention;

FIG. 2a is a fragmentary schematic elevation illustrating the embodiment of FIG. 1 in a first operational condition during movement of the vehicle;

FIG. 2b is a fragmentary schematic elevation corresponding to FIG. 2a and illustrating the apparatus in a second operational condition while the vehicle is stopped;

FIG. 2c is a fragmentary schematic elevation corresponding to FIGS. 2a and 2b and illustrating a third operational condition of the apparatus in which a special condition is recorded in the form of a zig-zag line while the vehicle is stopped;

FIG. 3 is a fragmentary schematic elevation illustrating a modified embodiment in the operational condition of FIG. 2c; and FIG. 4 is a fragmentary schematic elevation illustrating another modified embodiment of the invention in the operative condition of FIG. 2c.

Referring now to the drawings, and more particularly to FIGS. 1, 2a, 2b and 2c, a frame 1 which is built into the housing, not shown, of a recording tachograph or speedometer, two guide rails 2, 3 are stationarily mounted. A slide 4 which carries a recording arm 5 with a recording stylus 6 is mounted on rails 2, 3 for movement so that stylus 6 moves in radial direction of a record sheet 7 which is rotated in the usual manner by a clockwork, not shown. Slide 4 has a rack portion 10 meshing with a gear 11 mounted for turning movement on a fixed shaft 12. Gear 11 is driven through an intermediate gear, not shown, by a gear 14 which is carried by a shaft 13 whose angular position represents the speed of the vehicle. A shaft 17 is driven from a part of the vehicle which rotates at a speed proportionate to the road speed of the vehicle and carries a permanent magnet, not shown, which produces in a copper drum 16 having a temperature compensating ring 15, Eddy currents which exert a turning moment on drum 16 which is compensated by the action of a spiral spring 18, one end of which is secured to shaft 13 and the other end of which is attached to the frame 1. Consequently, during movement of the vehicle, gear 14 and thereby gear 12 will be angularly displaced an angle representing the speed of the vehicle, and slide 4 will be displaced a corresponding distance together with the stylus 6 recording a line 8 whose peaks and valleys represent the higher and lower speeds of the vehicle. Recording means 4, 5, 6 will be in the innermost radial position in relation to the rotating record sheet 7 when the vehicle is at a standstill and the speed of the vehicle is zero, so that this innermost position may be referred to as a zero position. FIG. 1 shows a zig-zag recording 9 made by stylus 6 in the zero position while the recording means 4, 5, 6 are vibrated in a manner which will be described hereinafter, and it will be understood that without vibration of recording means 4, 5, 6, a circular line will be made by stylus 6 while the vehicle is at a standstill, and that the arc of the circular line will represent the time during which the vehicle was stopped, which time is, of course, also represented by the zig-zag line 9.

Another recording stylus 22 is mounted on a recording arm 19 which is mounted for angular movement on a pivot 20 secured to frame 1. Styluses 6 and 19 are mounted in aligned bores of U-shaped portions of arm 5 and 19 surrounded and biased by coil springs so that the points resiliently engage the record sheet 7.

Recording arm 19 has a bent down coupling portion 23 which cooperates with a coupling rod 24 mounted in aligned bores of frame 1 and having an end cooperating with a drive lever 25 which is mounted on frame 1 for pivotal movement about a shaft 28. A spring 27 connects the shorter arm of recording lever 19 with frame 2 and urges recording lever 19 to turn in counterclockwise direction. A fixed stop 26 limits angular displacement of recording lever 19 in clockwise direction. In the operational position of FIG. 2a in which the vehicle moves, spring 27 turns recording lever 19 to a position in which coupling portion 23 abuts the end of coupling rod 24 and urges the same to engage drive lever 25. Vibratory drive means are provided and include an impulse generator, see FIGS. 2a, 2b and 2c and two electromagnetic means 31 and 32 receiving impulses from the impulse generator and actuating armatures 29 and 30, respectively, to oscillate drive lever 25 different amplitudes, depending on whether electromagnet 31 or electromagnet 32 is energized.

Slide 4 has a coupling portion 33 engaging drive lever 25 when abutment portions 33a engages a fixed abutment 34 of frame 1 in the zero position of recording means 4, 5, 6 assumed when the vehicle stops.

Slide 4 carries an elongated leaf spring 35 which engages recording lever 19 in the zero position of recording means 4, 5, 6 illustrated in FIGS. 2b and 2c. When abutment portion 33a abuts abutment 34, control spring 35 holds recording lever 19 in an angular position abutting stop 26. In this position, coupling portion 23 is spaced from the end of coupling rod 24 a small distance so that coupling rod 24, when oscillated by oscillating drive lever 25, cannot engage coupling portion 23 and oscillate recording means 19, 22.

FIG. 2a illustrates the operational condition of the recording instrument while the vehicle moves at varying speeds. Gears 14 and 11 assume angular positions representing the varying speed of the vehicle, and recording means 4, 5, 6 are moved by gear 11 and rack portion 10 corresponding distances so that a recording 8 is made on record sheet 7 which is turned by a clockwork, not shown, at a constant speed. Spring 27 turns recording means 19, 22 to a position in which coupling portion 23 engages coupling rod 24 so that the oscillating drive member 25 oscillates recording means 19, 22. Recording stylus 22 makes a zig-zag recording 21 on record sheet 7, and since record sheet 7 turns, the zig-zag line 21 will be made along a circle.

Drive lever 25 is oscillated by the armature of electromagnet 31, for example, if electric impulses are supplied to the same by the impulse generator, and armature 29 is vibrated. Armature 29 is operated by electromagnet 31 to oscillate at a smaller amplitude than the amplitude of oscillation of armature 30 which is controlled by electromagnet 32. By selectively energizing electromagnets 31 and 32, not only the amplitude of drive lever 25, but also the amplitude of oscillation of recording means 19, 22 is changed so that zig-zag recordings of different amplitude can be made as shown at 21 and 21a in FIG. 1. In order to assure operation of armature 30, both electromagnets 31, 32 are energized by impulse generator when a larger amplitude recording is desired, so that a greater force actuates drive lever 25 at the beginning of an oscillatory stroke.

The selection of electromagnet 31 or electromagnet 32 is effected by a switch, not shown, which is locked, and can be operated only if a key is used, so that only an authorized person can select either electromagnet 31 or electromagnet 32 for operation, which is necessary if the different amplitude recordings are used for identifying different drivers, for example.

When one of the electromagnets 31 or 32 is energized and displaces drive lever 25, coupling means 24, 23 effects turning of recording means 19, 22 in clockwise direction, and when the respective electromagnet is de-energized, spring 27 returns the recording means 19, 22 to the initial position so that record stylus 22 makes the zig-zag recording 21.

When the vehicle is stopped, the operational condition shown in FIG. 2b is obtained since gears 14 and 12 assume a position representing zero speed, recording means 4, 5, 6 is moved by spring 18 to the zero position in which abutment 33a engages abutment 34 so that recording stylus 6 is located in its innermost position recording a circular line on the record sheet 7 which continues to turn.

Control spring 35 moves with recording means 4, 5, 6 to a position resiliently engaging recording lever 19 and holding recording means 19, 22 in the position of FIG. 2b disconnected from the vibratory drive means 25, 28 to 32, so that recording means 19, 22 is not oscillated, and recording stylus 22 records a circular line as continuation of the zig-zag recording 21, assuming that the electromagnets 31 and 32 are not energized while the vehicle is stopped.

If a particular operation taking place while the vehicle is stopped is to be recorded by a special recording, for example the loading or unloading time of the vehicle, electromagnetic means 30 or 31 is energized by the impulse generator, and the vibratory drive means with drive lever 25 oscillate. Such oscillation is not transmitted by the coupling means 24, 23 to the recording means, 19, 22, since coupling means 23, 24 is disconnected, and recording lever 19 is blocked by control lever 35.

However, coupling portion 33 of recording means 4, 5, 6 is engaged by the oscillating drive lever 25 so that recording means 4, 5, 6 is oscillated and recording stylus 6 makes a zig-zag recording 9 in the operational condition of the apparatus shown in FIG. 2c.

When the particular operation, for example the loading of the vehicle, is finished, the respective electromagnet 30 or 31 is de-energized, and the recording means returned to the position of FIG. 2b in which both recording means record circular lines.

The length of the arc of the zig-zag recording 9 represents the loading time, which can be evaluated by examination of the record carrier sheet.

The embodiment of FIG. 3 operates on the same principle as the embodiment of FIG. 1. The recording lever 36 which carries recording stylus 22 is mounted on a pivot 37 and urged by spring 27 to turn in clockwise direction. Recording lever 36 has a first arm 38 with a stop 39 and a second arm 40 with a pin 41. Control spring 35 does not act directly on recording lever 36 as in the embodiment of FIG. 1, but on one arm of a double-armed lever 43 which is mounted on a pivot means 42 and has another arm engaging pin 41. In this manner, the resilient action of control spring 35 is reversed which is necessary since spring 27 biases recording lever 36 in clockwise direction in the embodiment of FIG. 3, contrary to the embodiment of FIG. 1 in which spring 27 biases recording lever 19 in counterclockwise direction.

An adjustable stop means includes a lever 46 turnable about a stationary pivot 45 between three positions I, O, II. Adjustable stop means 46 has a cutout 44 having three portions of different width. Depending on the angular position of adjustable stop means 46, stop 39 is located in different portions of cutout 44 so that the amplitude of oscillation of recording lever 36 can be set to three different amplitudes, resulting in recorded zig-zag lines 47 of different amplitudes and widths.

The provision of the adjustable stop means 44, 46 permits the use of only one electromagnet 48 having an armature 49 for oscillating the drive lever 51 which is mounted on a stationary pivot 50. A connecting link 52 is articulated at one end of drive lever 51 and has a slot 53 in which a pin secured to recording lever 36 is located.

When the drive lever 51 is oscillated by the vibratory drive means 48, 49 under the control of the impulse generator while the adjustable stop means 44, 46 is in the illustrated position and recording means 4, 5, 6 is in a speed recording position, recording lever 36 will oscillate the smallest amplitude since the width of cutout 44 is smallest in the center position of adjustable stop means 44, 46, and a zig-zag recording 47 will be made by stylus 22 while stylus 6 records a line representing the speed of the vehicle. When the vehicle is stopped, and electromagnet 48 is energized by the impulse generator, while recording means 4, 5, 6 is in the zero position in which coupling portion 33 engages drive lever 51, stylus 6 will record zig-zag line 55. Recording means 36, 22 is blocked by control spring 35 and control lever 43, and control link 52 oscillates without displacing pin 54 since the same is located in slot 53. Consequently, the blocked recording means 36, 22 records a circular line, indicating a particular operation while the vehicle is stopped. The end of such operation is indicated on the record sheet when the vibratory drive means 48, 49 is de-energized, and both recording means 6, 22 record circular lines.

Since recordings 47 of different width are used for identifying different operational conditions, adjustable stop means 46, 44 can be locked in each of the three positions by a suitable key, so that a fraudulent operation is not possible. Different drivers may be indicated by recorded zig-zag lines of different amplitudes.

The embodiment of FIG. 4 corresponds to the embodiment described with reference to FIG. 3. However, in order to assure an oscillatory movement of recording means 36, 22 even if the electric vibratory drive means 48, 49 fail, a pendulum 56 is secured to recording arm 36 and is oscillated by the vibration of the moving vehicle to help in the recording of a zig-zag line. Spring 27 and the arm of pendulum 56 form a mechanical oscillatory system. Recording arm 36 has a projection 57 which cooperates with an electromagnetic arresting means 59 in whose circuit a switch 58 is located. Switch 58 is secured to drive lever 51 and has a contact spring cooperating with coupling projection 33. When the vehicle is stopped, and recording means 4, 5, 6 assumes its zero position, switch 58 is closed by coupling portion 33 and electromagnetic arresting means 59 is energized to arrest recording arm 36 and to prevent oscillatory motion of recording means 36, 22. It will be seen that electromagnetic arresting means 59 performs the function of the control spring 35 in the embodiments of FIGS. 1 and 3. Recording means 4, 5, 6 is oscillated by drive lever 51 through the contact spring of switch 58 and coupling portion 33 so that the zig-zag line 55 is recorded by stylus 6 when the vibratory drive means are actuated while the vehicle is stopped and recording means 4, 5, 6 are moved to the zero position by spring 18 of the Eddy current device shown in the right portion of FIG. 1. While the vehicle moves, stylus 22 records a zig-zag line 47, whose width can be selected by turning the adjustable stop means 44, 46 to different positions so that the amplitude of oscillation of recording arm 36 are different, for example for representing different drivers.

It will be understood that each of the elements described above, or two or more together, may also find a useful application in other types of recording apparatus for vehicles differing from the types described above.

While the invention has been illustrated and described as embodied in a recording instrument for making zig-zag recordings under the control of vibratory electric drive means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A recording instrument for a vehicle, comprising, in combination, vibratory drive means; first recording means connected to and oscillated by said drive means for making a first recording on a moving record carrier in the form of a zig-zag line; second recording means for making a second recording on the record carrier; speed responsive means controlling said second recording means to record speed variations, said second recording means moving between speed recording positions during movement of the vehicle, and being in a zero position when the vehicle is stopped, said second recording means in said zero position disconnecting said first recording means from said vibratory drive means; and coupling means for connecting said vibrating drive means with said second recording means only in said zero position so that said second recording is a zig-zag line only when said vibratory drive means is operated in said zero position while the vehicle is stopped, and said first recording is a zig-zag line only while said second recording means is in a speed recording position and the vehicle has been started, and none of said first and second recordings is a zig-zag line when said vibratory drive means is not operated in said zero position of said second recording means.

2. A recording instrument according to claim 1 wherein said vibratory drive means include electromagnetic means, and an impulse generator means for supplying electric energizing impulses to said electromagnetic means.

3. A recording instrument according to claim 1 wherein said first recording means includes a recording arm mounted for oscillatory movement, a spring urging said arm to turn in one direction, and a stop limiting turning movement of said arm in the opposite direction; and wherein said second recording means includes resilient control means for engaging said arm in said zero position and for holding said arm against said stop so that oscillatory movement of said arm is prevented.

4. A recording instrument according to claim 3 wherein said resilient control means includes a leaf spring resiliently abutting said arm and holding the same for preventing oscillation thereof during oscillation of said resilient control means together with said second recording means coupled with said vibratory drive means in said zero position.

5. A recording instrument according to claim 3 wherein said resilient control means includes a control lever engaging said recording arm, and a leaf spring secured to said second recording means and engaging said control lever.

6. A recording instrument according to claim 3 wherein the resilient force of said resilient control means acting on said recording arm is greater than the resilient force of said spring so that said resilient control means holds said recording arm against the action of said spring.

7. A recording instrument according to claim 1 and including other coupling means for connecting said vibratory drive means with said first recording means, said other coupling means being disengaged by said second recording means in said zero position.

8. A recording instrument according to claim 7 wherein said first recording means includes a recording arm mounted for pivotal movement, and a spring acting on said arm for turning the same in a first direction; and wherein said other coupling means includes a coupling portion on said arm and a coupling rod oscillated by said vibratory drive means and engaging said coupling portion under the action of said spring.

9. A recording instrument according to claim 8 wherein said second recording means includes a resilient control means engaging said recording arm in said zero position for holding the same in a position in which said coupling portion is spaced from said coupling rod.

10. A recording instrument according to claim 1 wherein said vibratory drive means includes electromagnetic means, impulse generator means for producing energizing impulses for said electromagnetic means, and a drive member oscillated by said electromagnetic means; and including a pendulum secured to said first recording means and responsive to vibrations of the vehicle to oscillate said first recording means in addition to, or in place of said vibratory drive means.

11. A recording instrument according to claim 1 and including an electromagnetic arresting means cooperating with said first recording means for blocking oscillatory movement of the same, when energized, and a switch connected in series with said electromagnetic arresting means, and being engaged and closed by said second recording means in said zero position for energizing said electromagnetic arresting means, said switch forming part of said coupling means which connect said vibratory drive means with said second recording means.

12. A recording instrument according to claim 11 wherein said vibratory drive means includes electromagnetic means and a drive member oscillated by said electromagnetic means; and wherein said switch is mounted on said drive member and has a contact spring; and wherein said coupling means includes said contact spring and a coupling portion secured to said second recording means.

13. A recording instrument according to claim 1 and comprising supporting means; wherein said second recording means includes a slide mounted on said supporting means and being moved along the same by said speed responsive means, said slide having said zero position; and wherein said vibratory drive means includes electromagnetic means and a drive member mounted for angular movement on said supporting means and being oscillated by said electromagnetic means; and wherein said coupling means includes a coupling portion on said slide engaging in said zero position said oscillating drive member so that said slide is reciprocated by said drive member and causes said second recording means to record a zig-zag line.

14. A recording instrument according to claim 13 wherein said first recording means includes a recording lever mounted for angular movement on said supporting means and having a coupling portion, and a spring connecting said recording lever with said supporting means for biasing said recording lever to turn in one direction, and including a coupling member engaged by said coupling portion under the action of said spring and engaging said drive member so that said recording member is oscillated for causing said first recording means to record a zig-zag line; and including control means operated by said slide and engaging in said zero position of said slide, said recording lever for holding the same in a position in which said coupling portion is spaced from said coupling member so that said recording lever is not oscillated by said drive member.

15. A recording instrument according to claim 1 wherein said drive means include two electromagnetic means having armatures, a drive member oscillated by said armatures at different amplitudes, respectively, when one or the other of said electromagnetic means is energized, and means for selectively energizing said electromagnetic means so that zig-zag lines of different widths are recorded in accordance with the selection of said electromagnetic means.

References Cited

UNITED STATES PATENTS 3,004,818　10/1961　Delfs et al. _____ 346—49
3,132,916　5/1964　Muller _____ 346—62

RICHARD B. WILKINSON, *Primary Examiner.*

J. W. HARTARY, *Assistant Examiner.*